United States Patent
Chang et al.

(10) Patent No.: US 10,367,435 B2
(45) Date of Patent: Jul. 30, 2019

(54) DUAL-VOLTAGE BRUSHLESS MOTOR

(71) Applicant: TECHTRONIC INDUSTRIES COMPANY LIMITED, Tsuen Wan, New Territories (CN)

(72) Inventors: Yijia Chang, Dongguan (CN); Heiman Lee, Tsuen Wan (CN)

(73) Assignee: TECHTRONIC INDUSTRIES COMPANY LIMITED, Tseun Wan, New Territories (HK)

( * ) Notice: Subject to any disclaimer, the term of this patent is extended or adjusted under 35 U.S.C. 154(b) by 0 days.

(21) Appl. No.: 15/543,254

(22) PCT Filed: Jan. 20, 2015

(86) PCT No.: PCT/CN2015/071124
§ 371 (c)(1),
(2) Date: Jul. 13, 2017

(87) PCT Pub. No.: WO2016/115684
PCT Pub. Date: Jul. 28, 2016

(65) Prior Publication Data
US 2017/0373620 A1 Dec. 28, 2017

(51) Int. Cl.
*H02K 5/00* (2006.01)
*H02P 6/18* (2016.01)
(Continued)

(52) U.S. Cl.
CPC .............. *H02P 6/188* (2013.01); *H02K 5/00* (2013.01); *H02P 6/00* (2013.01); *H02P 6/005* (2013.01);
(Continued)

(58) Field of Classification Search
CPC ............ H02K 5/00; H02P 6/005; H02P 6/188
See application file for complete search history.

(56) References Cited

U.S. PATENT DOCUMENTS 5,677,580 A * 10/1997 Huang ................. H02K 21/227
  310/194
5,705,909 A * 1/1998 Rajashekara ....... B60L 11/1803
  318/801
(Continued)

FOREIGN PATENT DOCUMENTS

CN        101083421 A     12/2007
CN        102290789 A     12/2011
(Continued)

OTHER PUBLICATIONS

International Search Report and Written Opinion for Application No. PCT/CN2015/071124 dated Aug. 26, 2015 (8 pages).

*Primary Examiner* — Muhammad S Islam
(74) *Attorney, Agent, or Firm* — Michael Best & Friedrich LLP

(57) ABSTRACT

A dual-voltage brushless motor (30) includes a casing, a motor shaft (20) rotatably coupled to the casing, a rotor fixedly connected to the motor shaft (20), and a stator (28) configured to face the motor. The rotor contains a plurality of permanent magnets, and the stator (28) includes a first set of winding and a second set of winding. The first winding is electrically isolated from the second winding. The dual-voltage brushless motor (30) is adapted to be driven when the first set of winding receives a first control signal or when the second set of winding receives a second control signal. By configuring two separate motor controllers of the motor, the motor (30) can be operated under different power supplies such as AC power supply and DC power supply. As a result the application of the motor is greatly extended.

10 Claims, 3 Drawing Sheets

(51) Int. Cl.
*H02P 27/06* (2006.01)
*H02P 6/00* (2016.01)
*H02P 25/22* (2006.01)
*H02P 6/08* (2016.01)

(52) U.S. Cl.
CPC .............. *H02P 6/08* (2013.01); *H02P 25/22* (2013.01); *H02P 27/06* (2013.01)

(56) References Cited

U.S. PATENT DOCUMENTS

| | | | |
|---|---|---|---|
| 5,929,549 A | 7/1999 | Trago | |
| 6,437,529 B1* | 8/2002 | Brown | H02K 16/04 318/400.21 |
| 2003/0127932 A1* | 7/2003 | Ishida | B25F 5/00 310/184 |
| 2013/0069578 A1 | 3/2013 | Lin | |
| 2015/0069886 A1* | 3/2015 | Hsu | H02K 5/10 310/68 D |

FOREIGN PATENT DOCUMENTS

| | | |
|---|---|---|
| CN | 202772838 U | 3/2013 |
| CN | 102780428 B | 9/2015 |

\* cited by examiner

DUAL-VOLTAGE BRUSHLESS MOTOR

FIELD OF INVENTION

This invention relates to an electrically powered device, and in particular Direct Current (DC) brushless motors.

BACKGROUND OF INVENTION

Brushless DC motors are widely used nowadays due to a number of its advantages over brush-type motors. For example, the brushless DC motors use permanent magnets in the rotor, but electronically controlled windings in the stator, where the brushes which are subject to physical wear are eliminated and the lifespan of the motor can be greatly extended. Further, due to the electronic control of the stator windings by microcontrollers or other controlling units, the rotation of the brushless motor can be controlled in a more precise way, that desired speed of the motor can be achieved by serving precise control signals to the windings of the motor.

However, in conventional brushless motors there is usually only one set of windings in the stator connected to a motor controller, meaning that the motor is only capable of receiving one DC voltage from an external power supply. Therefore, the application of such brushless motors is limited in that the required single type power supply has to be configured at all time for proper operation of the motor.

SUMMARY OF INVENTION

In the light of the foregoing background, it is an object of the present invention to provide an alternate brushless motor which will not be limited to use only one type of power supply.

The above object is met by the combination of features of the main claim; the sub-claims disclose further advantageous embodiments of the invention.

One skilled in the art will derive from the following description other objects of the invention. Therefore, the foregoing statements of object are not exhaustive and serve merely to illustrate some of the many objects of the present invention.

Accordingly, the present invention, in one aspect, is a dual-voltage brushless motor including a casing, a motor shaft rotatably coupled to the casing, a rotor fixedly connected to the motor shaft, and a stator configured to face the motor. The rotor contains a plurality of permanent magnets, and the stator includes a first set of winding and a second set of winding. The first winding is electrically isolated from the second winding. The dual-voltage brushless motor is adapted to be driven when the first set of winding receives a first control signal or when the second set of winding receives a second control signal.

Preferably, the first control signal and the second control signal are different in mean voltage.

In one implementation, the motor further contains a first controller and a second controller. The first set of winding further includes three-phase windings connected to the first controller. The second set of winding further includes three-phase windings connected to the second controller.

Preferably, the motor further contains a rectifying circuit, the first controller connected to an AC power supply via the rectifying circuit.

More preferably, the rectifying circuit is adapted to receive 120V or 230V AC voltage from the AC power supply.

In one variation, the second controller is connected to a battery pack.

Preferably, the second controller is adapted to receive 18V, 36V, 48V or 56V DC voltage so from the battery pack.

In another variation, the motor includes a first circuit board fixed to one end of the stator of the motor. A plurality of Hall sensors is configured on the first circuit board and connected to the first controller.

Preferably, the motor further includes a second circuit board fixed to another end of the stator of the motor. A plurality of Hall sensors is configured on the second circuit board and connected to the second controller.

In another variation, the motor includes a first circuit board fixed to one end of the stator of the motor. A plurality of Hall sensors is configured on the first circuit board and connected to the first controller and the second controller at the same time.

There are many advantages to the present invention, the most important one being that the dual-voltage brushless motor in the present invention is adapted to receive two alternative power supplies for the motor's normal operation. In one mode, the motor can be connected to an AC power supply like a 220V or 110V mains electricity, where the AC voltage is then rectified into DC voltage and supplied to the respective motor controller. In another mode, the motor can be connected to a DC power supply like a battery pack and the battery voltage is directly supplied to the respective motor controller for driving the motor. As a result, the motor can be operated whenever one of the two types of power supplies is available, which greatly expands the application of the motor compared to those in the prior art. Depending on the operation environment, users may connect the motor to the mains electricity for example when the motor is used indoors, and connect the motor to battery pack when a power tool containing the motor is used outdoors.

Another advantage of the present invention is that the BLDC motor provided with two separate motor controllers in fact achieves a redundant control circuit design. In case one of the motor controllers fails to operate normally due to malfunctions, the other motor controller may still be used to control the motor.

BRIEF DESCRIPTION OF FIGURES

The foregoing and further features of the present invention will be apparent from the following description of preferred embodiments which are provided by way of example only in connection with the accompanying figures, of which.

DETAILED DESCRIPTION OF THE PREFERRED EMBODIMENTS

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

As used herein and in the claims, "couple" or "connect" refers to electrical coupling or connection either directly or indirectly via one or more electrical means unless otherwise stated.

Figure 1:
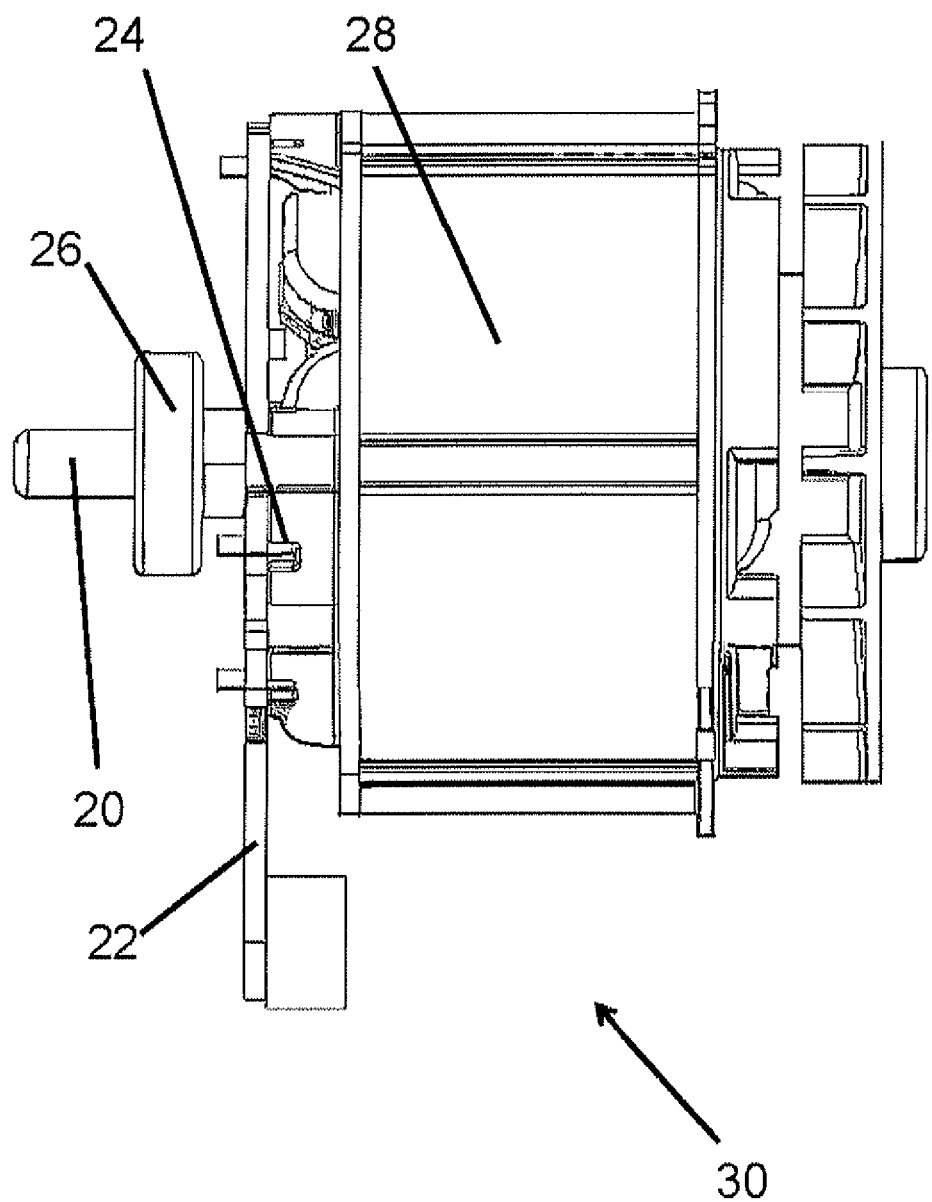
FIG. 1 is a side view of a dual-voltage brushless motor according to one embodiment of the present invention.

Referring now to FIG. 1, the first embodiment of the present invention is a dual-voltage brushless DC motor (BLDC) 30 including a casing (not shown) and a motor shaft 20 rotatably coupled to the casing by more than one bearing 26. There is also a rotor (not shown) fixedly connected to the motor shaft 20, where the rotor contains a plurality of permanent magnets (not shown) as a skilled person would understand. The motor 30 also contains a stator 28 configured to face the rotor. In the illustrated embodiment the stator 28 basically surrounds the rotor part but in other embodiment the brushless motor 30 may also has an outer rotor and inner stator design. The stator 28 includes a first winding and a second winding (not shown), for example by interlaced configuration on the inner surface of the stator 28. Each of the first winding and second winding further contains three-phase windings. The first winding is electrically isolated from the second winding.

As shown in FIG. 1, the brushless motor 30 also contains a circuit board 22 connected to one end of the stator 28 by screws (not shown) or other fastening means. On the circuit board 22 there are mounted a plurality of Hall-effect sensors 24 which are used to sense angular positions of the rotor by detecting varying magnetic fields generated by rotor magnets. The Hall sensors 24 are electrically connected to two motor controllers of the BLDC motor 30 at the same time, which will be described in detailed below.

Figure 2:
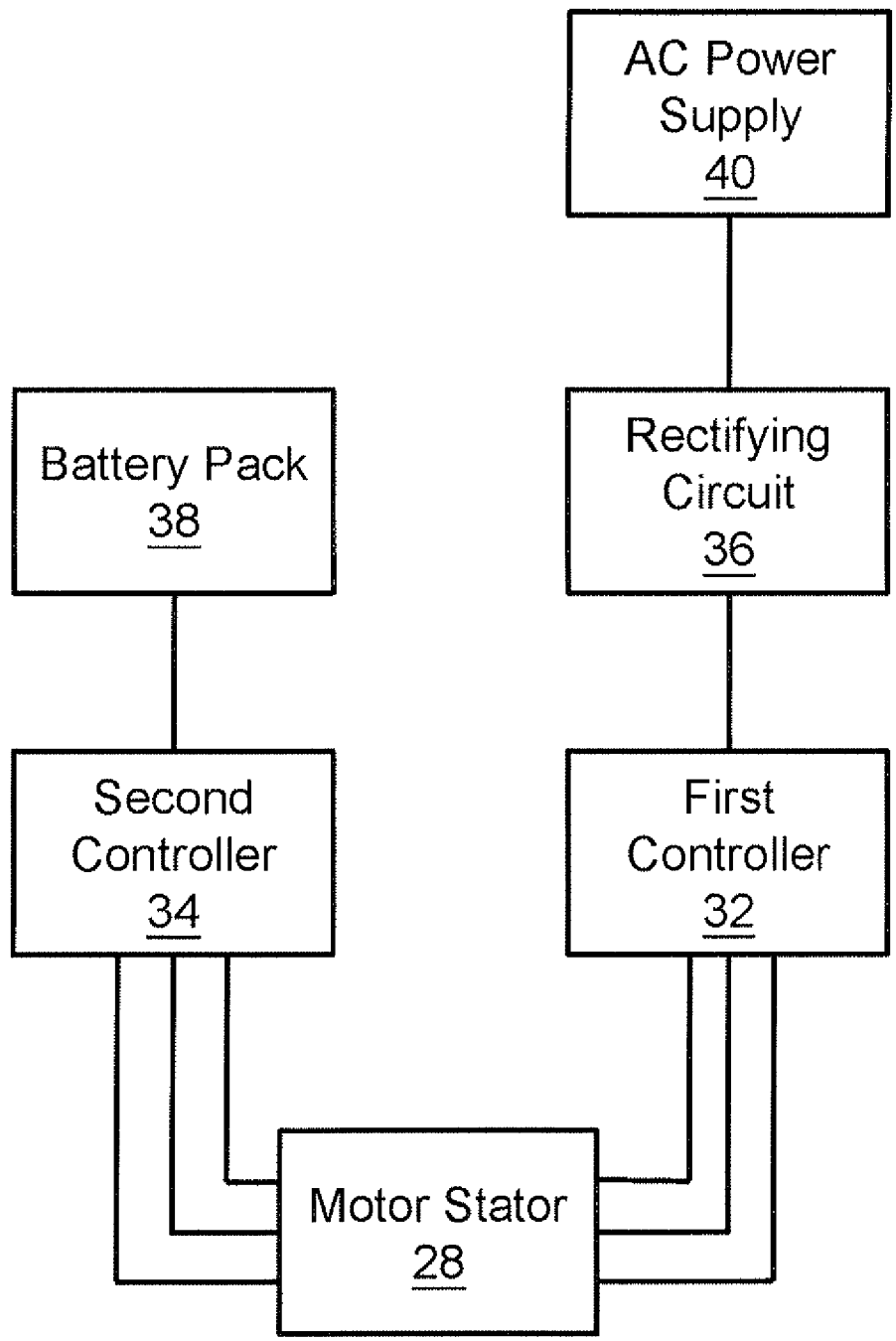
FIG. 2 shows the schematic circuit diagram of a dual-voltage brushless motor according to one embodiment of the present invention connected to external power supplies.

Turning now to FIG. 2, the stator 28 of the motor 30 as described includes two separate sets of windings. The first set of windings is connected to the first controller 32 and in turn is driven by the first controller 32 to generate predetermined magnetic fields at time intervals to drive the rotor. In the embodiment as shown the first controller 32 is ultimately connected to a AC power supply 40 for example a wall socket, plug socket, etc. that is connected to the mains electricity 110V or 230V. However, the first controller 32 itself is configured to receive only DC power supply and use the DC voltage to generate three-phase control signal drive the three-phase windings. As a result, a rectifying circuit 36 is placed between the AC power supply 40 and the first controller 32 to convert the incoming AC voltage to DC voltage first before providing the electric power to the first controller 32. Examples of rectifying circuit 36 include bridge rectifiers, voltage multipliers, semiconductor rectifiers, etc. In a preferred embodiment the rectifier is able to convert either 110V or 230V AC voltage to a constant DC voltage for powering the first controller 32. As skilled persons would understand, inverters or power regulators may also be used between the rectifying circuit 36 and the first controller 32 to adjust the DC voltage to a desired level, if necessary.

On the other hand, a second controller 34 can be connected to the motor stator 28, and in particular a second set of windings (not shown). Like the case of the first controller 32, the second set of windings is driven by the second controller 34 to generate predetermined magnetic fields at certain time intervals to drive the rotor. Note that as the first set of windings and the second set of windings are electrically isolated, the second controller 34 is also in an electric circuit that is isolated from that of the first controller 32. However, in some embodiment there may be mutual connections between the first controller 32 and the second controller 34 so that in case one of the motor controllers fails, the other normal, functional controller may still be in place to drive the BLDC motor. However, different from the first controller 32, the second controller is adapted to connect to DC voltage sources such as battery pack 38, which output DC voltage directly to the second controller 34 and thus no rectifying circuit would be required. For example, the battery packs may have rated output voltage at 18V, 36V, 48V or 54V. Inverters or power regulators may also be used between the battery pack 38 and the second controller 34 to adjust the DC voltage to a desired level, if necessary.

In this embodiment, the first controller and the second controller are both connected to the single circuit board having the Hall effect sensors. The outputs of the Hall sensors will be used both for feedback controls by the first controller and the second controller.

Although both the first controller and the second controller are configured to receive DC voltage to drive the motor, they are designed to work under different voltages. For example, the first controller which is connected to the AC power supply may be configured to work under a larger DC voltage and thus generates a larger control signal. The second controller which is connected to the DC power supply may be configured to work under a smaller DC voltage and thus generated a small control signal. The larger control signal and the small control signal are mainly differed in their mean voltage, although the waveform of each control signal itself is time-varying.

Figure 3:
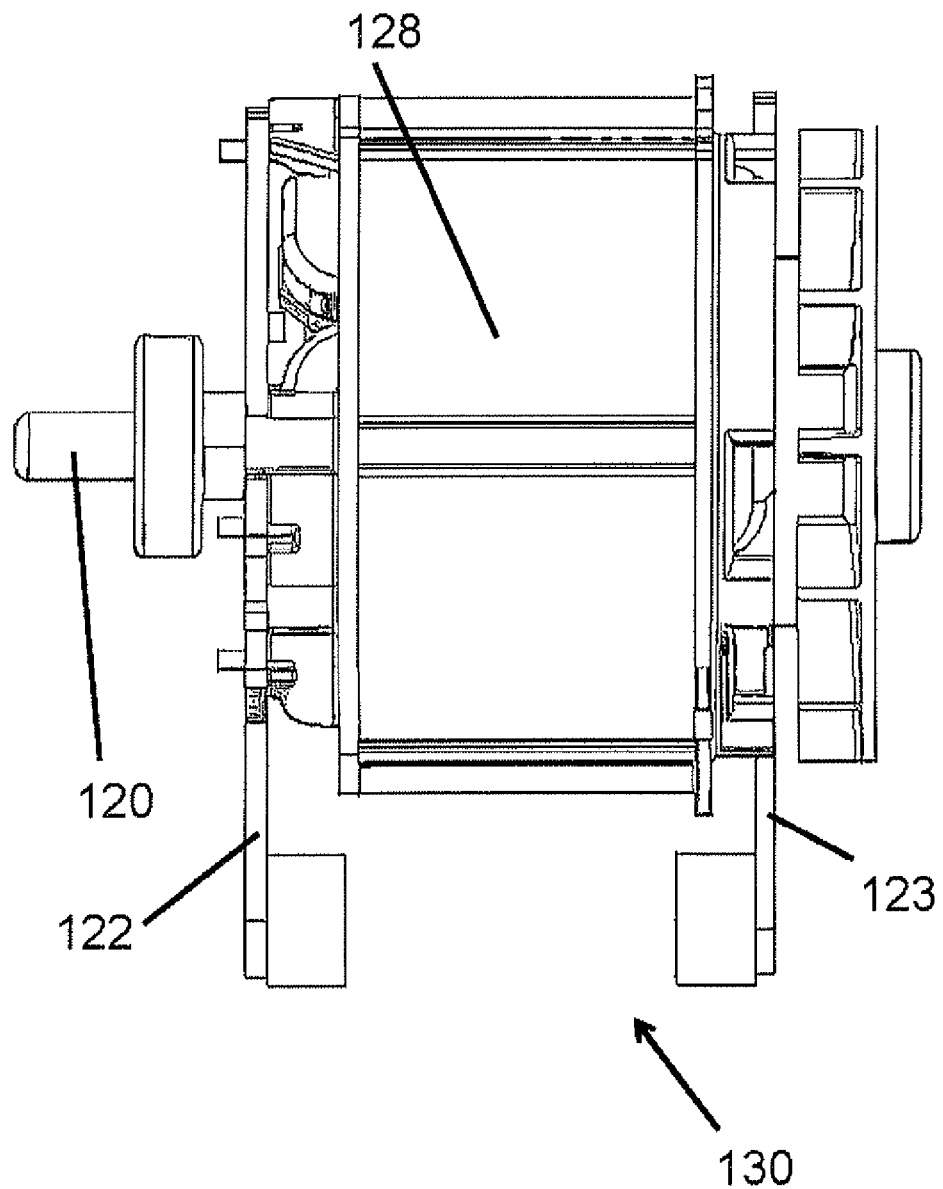
FIG. 3 is a side view of a dual-voltage brushless motor according to another embodiment of the present invention.

In another embodiment of the present invention as shown in FIG. 3, the motor 130 includes two circuit boards, namely a first circuit board 122 and a second circuit board 123, both of which are physically connected to the stator 128. On each one of the first circuit board 122 and the second circuit board 123, there are a number of Hall effect sensors (not shown) and those on the first circuit board 122 are connected to the first controller of the motor, and those on the second circuit board 123 are connected to the second controller of the motor. By separating the Hall sensors for different controllers of the motor, the performance of Hall sensors in rotor position and speed detection can be made more precise, since the Hall sensors on each circuit board are now dedicated and optimized for predetermined voltages designed for the corresponding motor controller.

The BLDC motor described in the embodiments above are thus capable of being driven by either AC voltage (via rectifying means) or DC voltage. Preferably, in order to obtain a constant motor output performance, the first set of windings and the second set of windings are so designed that the resulted motor speed and torque as when the motor is actuated by the first set of windings or the second set of windings are equivalent or only differs in a small tolerance.

The exemplary embodiments of the present invention are thus fully described. Although the description referred to particular embodiments, it will be clear to one skilled in the art that the present invention may be practiced with variation of these specific details. Hence this invention should not be construed as limited to the embodiments set forth herein.

While the invention has been illustrated and described in detail in the drawings and foregoing description, the same is to be considered as illustrative and not restrictive in character, it being understood that only exemplary embodiments have been shown and described and do not limit the scope of the invention in any manner. It can be appreciated that any of the features described herein may be used with any embodiment. The illustrative embodiments are not exclusive of each other or of other embodiments not recited herein.

Accordingly, the invention also provides embodiments that comprise combinations of one or more of the illustrative embodiments described above. Modifications and variations of the invention as herein set forth can be made without departing from the spirit and scope thereof, and, therefore, only such limitations should be imposed as are indicated by the appended claims.

For example, although the specific voltages for the DC/AC mode of motor operation are given above, such as 110V or 230V AC or 18/36/48/54 V DC, one skilled in the art should understand that these voltage ratings are exemplary values only, and the present invention is not limited to these specific values. Other types of power supplies with different output rating can also be implemented for driving a BLDC motor, and the controller and other driving circuitry can also be configured to receive electric power from such power supplies.

In the above embodiments, the BLDC motors are described to be capable to be connected to both an AC power supply and a DC power supply. However, in other implementations it is also possible to configure the motor to use DC power only, for example the motor is connected to two different battery packs with different output voltages. Likewise, the motor can be configured to use AC power only, and the motor is connected to two different AC power supplies with different output voltages.

The invention claimed is:

1. A dual-voltage brushless motor, comprising:
   a) a casing;
   b) a motor shaft rotatably coupled to said casing;
   c) a rotor fixedly connected to said motor shaft; said rotor comprising a plurality of permanent magnets; and
   d) a stator configured to face said rotor; wherein said stator comprising a first set of windings and a second set of windings;
   wherein the first set of windings is in electrical communication with an AC power supply, wherein the second set of windings is in electrical communication with a DC power supply, wherein said first set of windings is electrically isolated from said second set of windings; and
   wherein said dual-voltage brushless motor is driven when said first set of windings receives a first control signal or when said second set of windings receives a second control signal.

2. The dual-voltage brushless motor of claim 1, wherein said first control signal and said second control signal are different in mean voltage.

3. The dual-voltage brushless motor of claim 1, further comprises a first controller and a second controller, said first set of windings further comprising three-phase windings connected to said first controller; said second set of windings further comprising three-phase windings connected to said second controller.

4. The dual-voltage brushless motor of claim 3, further comprises a rectifying circuit, said first controller connected to the AC power supply via said rectifying circuit.

5. The dual-voltage brushless motor of claim 4, wherein said rectifying circuit is adapted to receive 120V or 230V AC voltage from said AC power supply.

6. The dual-voltage brushless motor of claim 3, wherein said second controller is connected to the DC power supply, wherein the DC power supply is a battery pack.

7. The dual-voltage brushless motor of claim 6, wherein said second controller is adapted to receive 18V, 36V, 48V or 56V DC voltage from said battery pack.

8. The dual-voltage brushless motor of claim 1, further comprising a first circuit board fixed to one end of said stator of said motor, and a plurality of Hall sensors configured on said first circuit board and connected to said first controller.

9. The dual-voltage brushless motor of claim 8, further comprising a second circuit board fixed to another end of said stator of said motor; and a plurality of Hall sensors configured on said second circuit board and connected to said second controller.

10. The dual-voltage brushless motor of claim 1, further comprising a first circuit board fixed to one end of said stator of said motor; and a plurality of Hall sensors configured on said first circuit board and connected to said first controller and said second controller.

* * * * *